(12) United States Patent
Ducharme et al.

(10) Patent No.: US 9,503,775 B2
(45) Date of Patent: Nov. 22, 2016

(54) CONTENT ACCESS DEVICE WITH POLLING PROCESSOR AND METHODS FOR USE THEREWITH

(71) Applicant: ViXS Systems, Inc., Toronto (CA)

(72) Inventors: Paul D. Ducharme, Richmond Hill (CA); Norman Vernon Douglas Stewart, Toronto (CA); Kuldip Sahdra, Richmond Hill (CA); Krzysztof Socha, Mississauga (CA); Chak Cheung Ho, Markham (CA); Lewis Leung, Markham (CA)

(73) Assignee: ViXS Systems, Inc., Toronto (CA)

( * ) Notice: Subject to any disclaimer, the term of this patent is extended or adjusted under 35 U.S.C. 154(b) by 98 days.

(21) Appl. No.: 14/217,775

(22) Filed: Mar. 18, 2014

(65) Prior Publication Data

US 2015/0271545 A1 Sep. 24, 2015

(51) Int. Cl.
| | |
|---|---|
| *H04N 7/16* | (2011.01) |
| *H04N 21/426* | (2011.01) |
| *H04N 21/434* | (2011.01) |
| *H04N 21/2347* | (2011.01) |
| *H04N 21/231* | (2011.01) |
| *H04N 21/4385* | (2011.01) |
| *H04L 29/06* | (2006.01) |

(52) U.S. Cl.
CPC .... *H04N 21/42623* (2013.01); *H04N 21/2347* (2013.01); *H04N 21/23103* (2013.01); *H04N 21/434* (2013.01); *H04N 21/43853* (2013.01); *H04L 63/0428* (2013.01)

(58) Field of Classification Search
CPC .................................................. H04N 21/23103
USPC ..................................................... 725/139, 151
See application file for complete search history.

(56) References Cited

U.S. PATENT DOCUMENTS

| | | | | |
|---|---|---|---|---|
| 6,789,131 | B1* | 9/2004 | Johnson | H04L 45/60 709/238 |
| 8,635,659 | B2* | 1/2014 | Walter | A63F 13/12 715/727 |
| 2004/0008713 | A1* | 1/2004 | Knight | G06F 13/28 370/428 |
| 2006/0179465 | A1* | 8/2006 | Lemmers | H04N 21/235 725/100 |
| 2014/0189091 | A1* | 7/2014 | Tamasi | H04L 43/0858 709/224 |
| 2015/0082368 | A1* | 3/2015 | Mamidwar | H04N 21/4405 725/118 |

* cited by examiner

*Primary Examiner* — Olugbenga Idowu
(74) *Attorney, Agent, or Firm* — Garlick & Markison; Bruce E. Stuckman

(57) ABSTRACT

A content access device includes an interface module that receives a transport stream and outputs a processed transport stream. An input buffer buffers the received transport stream. A polling processor processes the transport stream based on the at least one key to generate the processed transport stream, wherein the polling processor operates to descramble individual packets of the transport stream in a plurality of polling slots of a polling loop. An output buffer buffers the processed transport stream for output by the interface module.

12 Claims, 5 Drawing Sheets

Transport stream with encrypted payload 150

| 0x47 | TEI | PUSI | TP | PID | SC | AF | CC | Adaptation Field | Encrypted TS Payload 300 |

FIG. 3

Transport stream with unecrypted payload 152

| 0x47 | TEI | PUSI | TP | PID | SC | AF | CC | Adaptation Field | Unencrypted TS Payload 310 |

FIG. 4

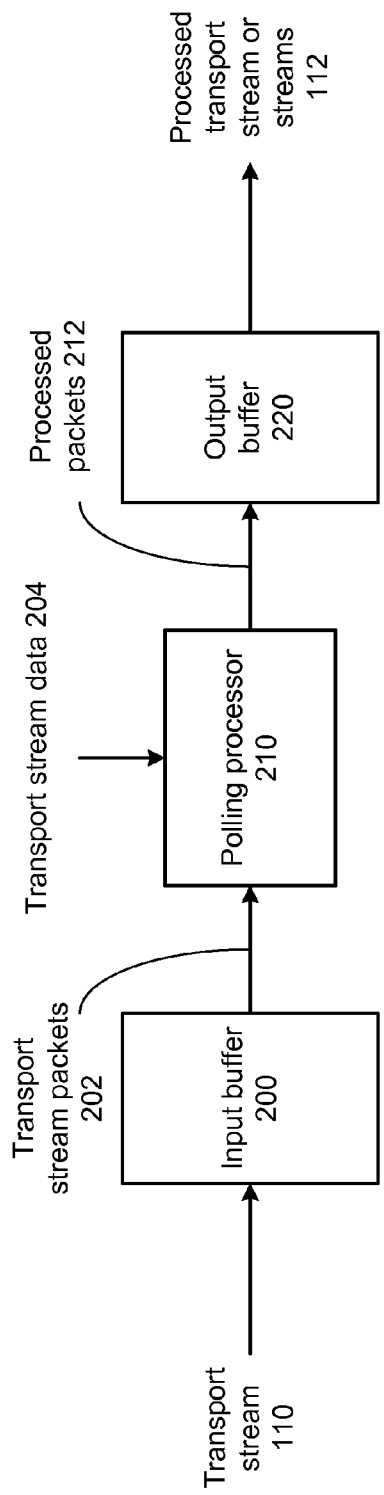
FIG. 5
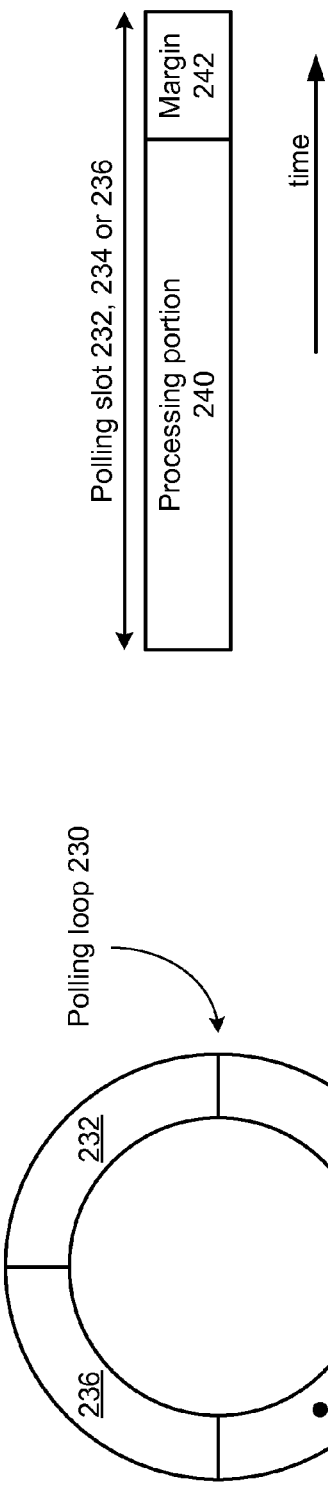
FIG. 7
FIG. 6

CONTENT ACCESS DEVICE WITH POLLING PROCESSOR AND METHODS FOR USE THEREWITH

TECHNICAL FIELD

The present disclosure relates to secure distribution and protection of content such as media content.

DESCRIPTION OF RELATED ART

Currently the delivery of encrypted video/audio compressed content is managed with a variety of transport stream (TS) formats. For example, encrypted transport streams are used in Satellite/Cable Broadcast, etc. In these cases, the payload of TS packets contain packetized elementary stream (PES) packets. In addition, other devices such as digital video discs (DVDs) and Blu-Ray Discs (BDs) utilize encrypted transport streams. Note that PES packets are large packets which encapsulate an Elementary Stream (ES) which comprises small structures such as slices, macro blocks, and motion vectors for video and compressed pulse code modulation (PCM) samples for audio.

The processing of encrypted transport streams must be performed at various stages of video distribution. The process of decrypting compressed content may involve multiple transfers to/from memory which requires additional memory buffers and consumes bandwidth. This introduces a security risk because clear compressed content resides in memory for a period of time. There are various attacks where hackers attempt to read and export the compressed content, particularly in low end software only solutions where third party software operates in the same memory space that stores the content to be protected. This process can require additional hardware resources such as separate compression and encryption blocks. These are typically implemented as completely separate blocks which operate asynchronously requiring separate data paths and control interfaces.

The limitations and disadvantages of conventional and traditional approaches will become apparent to one of ordinary skill in the art through comparison of such systems with the present disclosure.

BRIEF DESCRIPTION OF THE SEVERAL VIEWS OF THE DRAWINGS

FIG. 3 presents a schematic block diagram representation of an encrypted transport stream packet in accordance with an embodiment of the present disclosure.

FIG. 4 presents a schematic block diagram representation of an unencrypted transport stream packet in accordance with an embodiment of the present disclosure.

FIG. 5 presents a schematic block diagram representation of a polling processor in accordance with an embodiment of the present disclosure.

FIG. 6 presents a graphical representation of a polling loop in accordance with an embodiment of the present disclosure.

FIG. 7 presents a graphical representation of a polling slot in accordance with an embodiment of the present disclosure.

DETAILED DESCRIPTION

Figure 1:
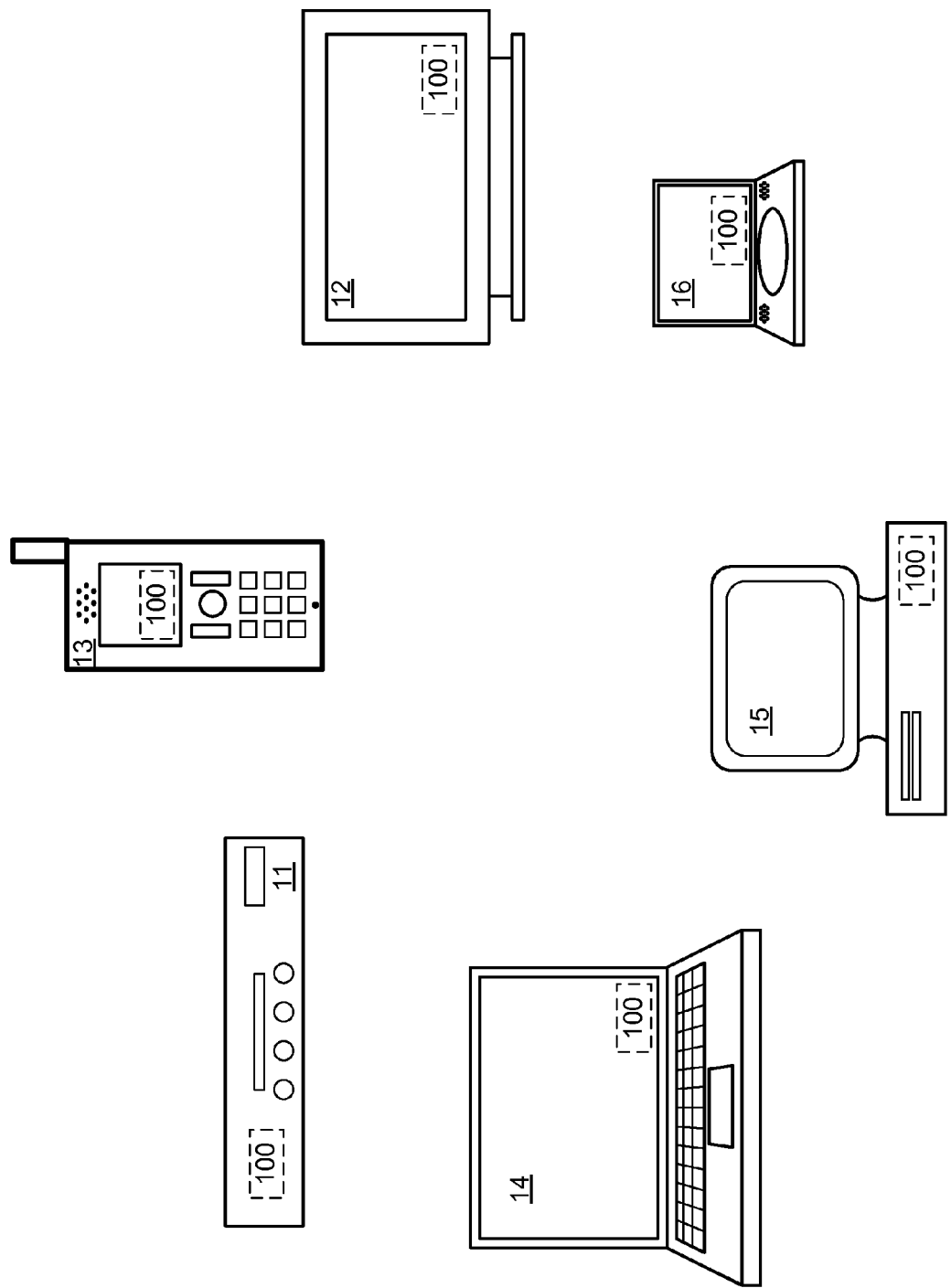
FIG. 1 presents a pictorial representation of example devices 11-16 that can include a content access device 100 in accordance with an embodiment of the present disclosure.

FIG. 1 presents a pictorial representation of example devices 11-16 that can include a content access device 100 in accordance with an embodiment of the present disclosure. In particular, these example devices include digital video recorder/set top box 11, television or monitor 12, wireless telephony device 13, computers 14 and 15, personal video player 16, or other devices that include a processing system. The content access device 100 will be described in greater detail in conjunction with FIGS. 2-9, including several optional functions and features.

Figure 2:
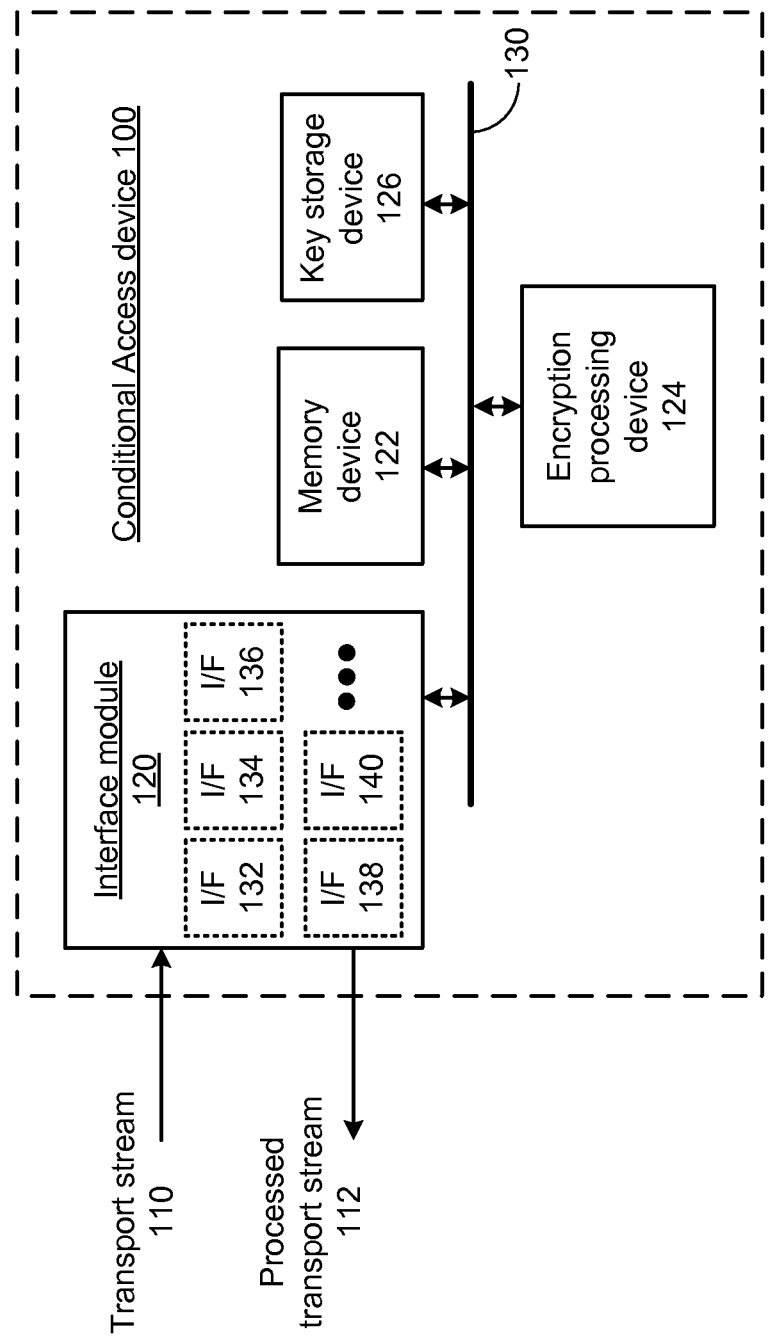
FIG. 2 presents a schematic block diagram representation of a content access device 100 in accordance with an embodiment of the present disclosure.

FIG. 2 presents a schematic block diagram representation of a content access device 100 in accordance with an embodiment of the present disclosure. The content access device 100 includes an interface module 120, a memory device 122, an encryption processing device 124 and a key storage device 126.

The interface module 120 includes a plurality of interfaces (132, 134, 136, 138, 140 . . . ) that operate in accordance with a corresponding plurality of interface formats. In operation, the interface module 120 is programmable to select at least one of the plurality of interfaces (132, 134, 136, 138, 140 . . . ) to receive a transport stream 110 and also to output a processed transport stream 112. In particular, a single interface (132, 134, 136, 138, 140 . . . ) can be selected to receive the transport stream 110 and output the processed transport stream 112. Alternatively, different interfaces (132, 134, 136, 138, 140 . . . ) can be selected to receive the transport stream 110 and output the processed transport stream 112 and/or different interfaces can be selected to receive a plurality of transport streams 110 and/or output a plurality of processed transport streams 112.

In an embodiment, the transport stream 110 is an audio, video or other media signal such as an over the air broadcast video signal, a satellite video signal, a cable television signal, a streaming video signal sent via the internet or other network, a video signal downloaded via the internet or other network or other media signal.

The interface formats can include a plurality of broadcast video card formats such as a cable card format, a common interface plus format and/or other broadcast video card format. In addition, the plurality of formats can include a plurality of wired computer interface formats such as a universal serial bus (USB) format, an Ethernet format, a small computer system interface (SCSI) format, a Firewire format and/or other wired computer interface format. The plurality of formats can further include least one generic memory card format such as a secure digital (SD) card format, a secure digital input output (SDIO) card format, a CompactFlash card format, a smart media card format, a multimedia card (MMC) format, a memory stick card format and/or other generic memory card format or other interface format for coupling transport stream 110 and processed transport stream 112 to/and from the content access device 100.

The key storage device 126 stores at least one key. The encryption processing device 124 retrieves the at least one key from the key storage device, and processes a transport stream 110 based on the at least one key to generate a processed transport stream 112. In an embodiment, the encryption processing device 124 generates the processed transport stream 112 from the transport stream 110 based on a digital rights management (DRM) function and/or conditional access system (CAS) function. For example, the encryption processing device can generate the processed transport stream 112 by descrambling or decrypting the transport stream 110, by scrambling or encrypting the transport stream 110, and/or by transcrypting or transsscrambling the transport stream 110 from one scrambling or encryption to another scrambling or encryption.

In an embodiment of the present disclosure, the encryption processing device 124 can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory device 122. Memory device 122 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is shown that employs a single bus 130, alternative architectures using direct connectivity between one or more modules and/or additional buses can likewise be implemented in accordance with the present disclosure.

The key storage device 126 can be implemented via a memory device such as a hard disk drive or other disk drive, read-only memory, random access memory, volatile memory, non-volatile memory, static memory, dynamic memory, flash memory, cache memory, and/or any device that stores digital information. In addition, while the key storage device 126 and memory device 122 are shown as separate devices, a single device can be used to implement both devices.

The content access device 100 can be implemented in conjunction with a video encoder, transcoder or decoder that produces the transport stream 110 or that decodes processed transport stream 112. In this fashion, the content access device 100 can embed the encryption or decryption operations within an encoder, transcoder or decoder.

In an example of operation, the content access device 100 is implemented in conjunction with a host device 11-16 that receives a video signal that includes a transport stream that is encrypted or otherwise scrambled. In this fashion, the operation of content access device 100, such as DRM or CAS functionality, can be implemented via a separate module. The interface module 120 is programmed via hardware, software or data generated in response to selection by a user to select one or more particular interfaces (132, 134, 136, 138 or 140, etc.) to receive the transport stream 110 from the host device 11-16 and to send the processed transport stream 112 back to the host device. The encryption processing device 124 decrypts or descrambles the TS 110 into a processed TS 112 such as a compressed video signal in an unencrypted transport stream format. In this example, the host device 11-16 relies solely on the content access device 100 for descrambling or decryption of the transport stream 110.

In another example of operation, the content access device 100 is implemented in conjunction with a host device 11-16 that receives a video signal that includes a transport stream that is encrypted or otherwise scrambled. As in the previous example, the operations of content access device 100, such as DRM or CAS functionality, can be implemented via a separate module. The interface module 100 is programmed via hardware, software or data generated in response to selection by a user to select one or more particular interface to (132, 134, 136, 138 or 140, etc.) to receive the transport stream 110 from the host device and to send the processed transport stream 112 back to the host device. The encryption processing device 124 decrypts or descrambles the TS 110 into a compressed video signal. The encryption processing device 124 then re-encrypts or re-scrambles the unencrypted transport stream into the processed transport stream 112 for transfer to the host device. In this fashion, the content access device 100 can securely descramble or decrypt the transport stream 110 from the scrambling or encryption employed by a content or service provider sending a signal that contains the transport stream 110 to the host device 11-16. The content access device 100 outputs a transport stream 112 that is re-scrambled or re-encrypted for secure transfer to the host device 11-16 and or for transmission, storage or decoding by the host device 11-16 for display. In this example, the host device is only privy to the keys used to re-scramble or re-encrypt the processed transport stream 112 and relies solely on the content access device 100 for descrambling or decryption of the transport stream 110.

In embodiments where the processed transport stream 112 is sent via the same interface from which the transport stream 110 is received, the output interface that sends the processed video signal 112 can operate to save the portions of the packet that are not processed via encryption processing device 124 to simplify the process of generating the packets of transport stream 112. In embodiments where the processed transport stream 112 is sent via a different interface from which the transport stream 110 is received, the output interface that sends the processed video signal 112 operates to generate transport packets in the format associated with the particular output interface that is selected.

FIG. 3 presents a schematic block diagram representation of an encrypted transport stream packet in accordance with an embodiment of the present disclosure. In particular, an example packet format for a transport stream with encrypted payload 150 is presented that may represent a packet format for either transport stream 110 or processed transport stream 112. An encrypted TS payload 300 is carried by a packet that further contains a sync byte such as 0x47 or other synchronization field, a transport error indicator (TEI), a payload unit start indicator (PUSI), a transport priority (TP), a packet identifier (PID), a scrambling control field (SC), an adaptation field exist (AF), a continuity counter (CC), an adaptation field, and/or other header error detection or correction codes and/or other control data. While a particular packet format is presented, other packet formats corresponding to other transport streams can likewise be employed. Further, while a packet format is shown that includes an encrypted payload, other portions of the packet can be encrypted as well.

FIG. 4 presents a schematic block diagram representation of an unencrypted transport stream packet in accordance with an embodiment of the present disclosure. In particular, an example packet format for a transport stream with unencrypted payload 152 is presented that may represent a packet format for either transport stream 110 or processed transport stream 112. An unencrypted TS payload 310 is carried by a packet that further contains a sync byte such as 0x47 or other synchronization field, a transport error indicator (TEI), a payload unit start indicator (PUSI), a transport priority (TP), a packet identifier (PID), a scrambling control field (SC), an adaptation field exist (AF), a continuity counter (CC), an adaptation field, and/or other header error detection or correction codes and/or other control data. While a particular packet format is presented, other packet formats corresponding to other transport streams can likewise be employed.

FIG. 5 presents a schematic block diagram representation of a polling processor in accordance with an embodiment of the present disclosure. In particular, polling processor 210 is presented that represents an embodiment of encryption processing device 124 that executes instructions stored in memory device 122 such as in a DDR memory or other memory of memory device 122. Input buffer 200 and output buffer 220 can be implemented via memory device 122 and can be configured as ring buffers or in other buffer configurations.

In an embodiment, the input buffer 200 is coupled to receive a transport stream 110 from the interface module 122. The polling processor 210 retrieves individual transport stream packets 202 of the transport stream 110 from the input buffer 200. Polling processor 210 processes the transport stream packets 202 to generate processed packets 212 that are stored in the output buffer 220. In particular, the polling processor 210 operates to descramble the transport stream packets 202 in a plurality of polling slots of a polling loop. The output buffer 220 buffers the processed packets 212 for output by the interface module 122 as the processed transport stream 112.

While the processing by polling processor 210 has been described above in conjunction with descrambling, other processing of the transport stream packets 202 including decrypting and/or re-scrambling or re-encrypting of the processed data stream 112 for secure transfer to the host device 11-16, reformatting, and/or other processing can also be implemented via polling processor 210. In an embodiment, transport stream 110 is an aggregated stream and the transport stream packets 220 are multiplexed together from a plurality of different transport streams. In this embodiment, the polling processor 210 can generate the processed packets 212 and demultiplex the processed packets for storage in separate queues of the output buffer 220 to generate a plurality of transport streams 112. The processing performed by polling processor 210 can include identifying and/or filtering stream IDs in the transport stream packets 202 and filtering or other processing of packet IDs in the transport stream packets 202 to demultiplex the processed packets 212 for the corresponding processed transport streams 112.

In an embodiment, the polling processor 210 is implemented via a soft core, e.g. minimal hardware interfaces and software to implement transport stream handling via a CPU rather than a state machine or other dedicated hardware solution. This can reduce the gates required to implement the device while providing greater flexibility to adapt to changes in transport stream format or other transport stream handling. In an embodiment, the polling processor 210 is implemented by a simple processing device that implements software without an operating system and without the use of interrupt service routines.

In a mode of operation, the polling processor 210 operates based on the principle of polling. Individual transport stream packets 202 are each descrambled in a corresponding one of the polling slots of the polling loop. In accordance with this example, the polling processor 210 operates each polling slot to retrieve one of the transport stream packets 202 from the input buffer 210, to descramble the transport stream packet 202 and optionally to provide demultiplexing and/or other packet handling or processing to generate a processed packet 212, and to load the processed packet 212 in the proper location in the output buffer 220 for reassembly of one or more processed transport streams 112. In addition to the operations described above, the polling processor 210 optionally inspects some or all of the packet header and/or packet payload of the transport stream packets 202 in order to determine necessary processing operations required for a given packet. In addition, the polling processor 210 may modify some or all of the packet header and/or packet payload of the transport stream packets 202 by substitution, appending or prefixing as required for downstream processing of the processed packets 212 by subsequent hardware or software.

In an embodiment, the polling processor 210 receives transport stream data 204 that indicates information pertaining to the transport stream 110. This transport stream data 204 can include information on whether the transport stream 110 includes multiple transport streams, corresponding stream IDs, indications of one or more corresponding transport stream formats, descrambling information and/or other data that can be used to determine the processing requirements of the transport stream 110 and/or the specific processing to be performed. In an embodiment, the processing speed of the polling processor 210 is adjusted based on the transport format of the transport stream 110 or other transport stream data 204. In particular, the processing speed of the polling processor 210 is adjusted based on the transport stream data 204 to maintain a processing margin for each of the plurality of polling slots.

FIG. 6 presents a graphical representation of a polling loop in accordance with an embodiment of the present disclosure. A polling loop 230 is presented that includes a plurality of polling slots 232, 234, 236, . . . . While a particular number of polling slots are presented, the polling processor can include any number of such polling slots.

As discussed in conjunction with FIG. 5, the polling processor 210 operates based on the principle of polling. In operation, the polling processor begins a polling slot by a polling command to the input buffer to see if a transport stream packet 202 is ready for processing and, if so, by retrieving the transport stream packet data corresponding to the transport stream packet 202. Individual transport stream packets 202 are each descrambled in a corresponding one of the polling slots of the polling loop. In accordance with this example, the polling processor 210 operates each polling slot to retrieve one of the transport stream packets 202 from the input buffer 210, to descramble the transport stream packet 202 and optionally to provide demultiplexing and/or other packet handling or processing to generate a processed packet 212, and to load the processed packet 212 in the proper location in the output buffer 220 for reassembly of one or more processed transport streams 112. When the last polling slot in the polling loop is completed, the polling processing proceeds to begin the polling loop 230 again from the first polling slot. In an embodiment, the number of polling slots corresponds to the number of different transport streams multiplexed together in an aggregated embodiment of transport stream 110 with each polling slot being dedicated to one individual stream to aid in the process of demultiplexing. However, other configurations can be employed including the use of multiple polling slots in conjunction with a single homogeneous transport stream 110.

FIG. 7 presents a graphical representation of a polling slot in accordance with an embodiment of the present disclosure. In particular, a processing slot 223, 234 or 236 is presented that includes a processing portion 240 along with a margin 242.

As discussed in conjunction with FIG. 5, the polling processor 210 can receive transport stream data 204 that indicates information on whether the transport stream 110 includes multiple transport streams, corresponding stream IDs, indications of one or more corresponding transport stream formats, descrambling information and/or other data that can be used to determine the processing requirements of the transport stream 110 and/or the specific processing to be performed. The processing speed of the polling processor 210 can adjusted based on the transport format of the transport stream 110 or other transport stream data 204.

In particular, the processing speed of the polling processor 210 is adjusted based on the transport stream data 204 to provide sufficient time in the processing portion 240 to correspond to the expected processing time or expected maximum processing time of transport stream packet 202. The margin 242 is provided at the end of the polling slot 232, 234 or 236 to maintain a processing margin in case a greater than expected processing time is required. In an embodiment, a margin of 20% of the total time of the polling slot, however other values including a fixed percentage of the time allocated for processing portion 240 or other pre-determined times may also be employed. The use of fixed polling slots 232, 234, 236 . . . , the adjustment of processor speed based on potential processing requirements and the use of margins 240 allow the polling processor 210 to operate on a fixed time schedule and avoid the use of interrupts.

Figure 8:
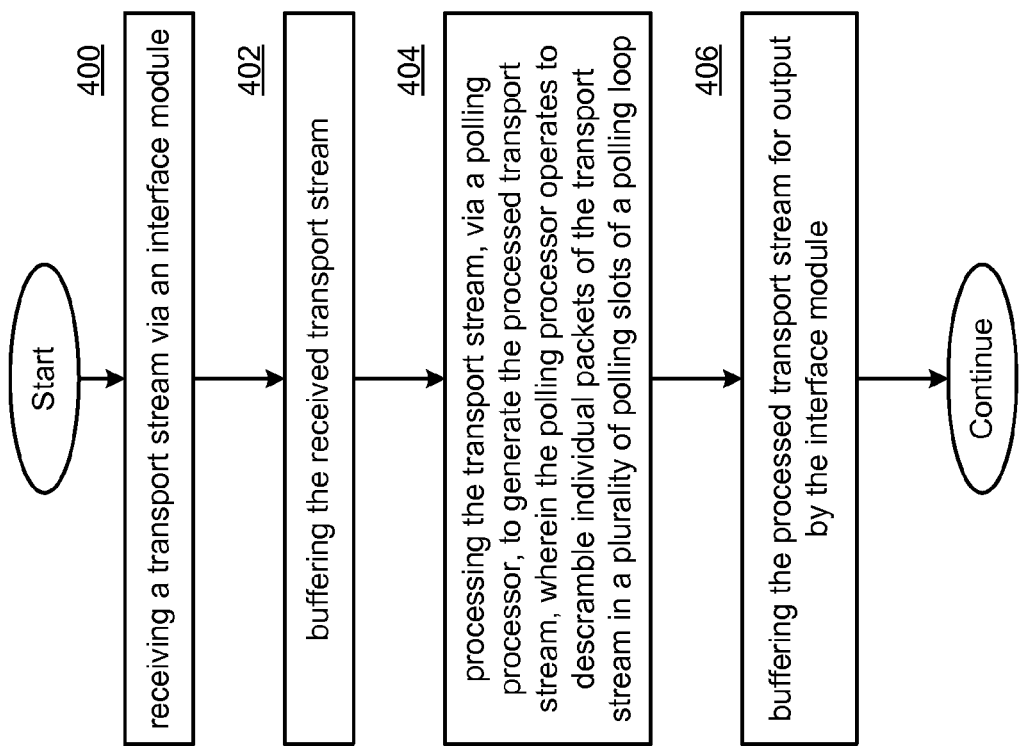
FIG. 8 presents a flowchart representation of a method in accordance with an embodiment of the present disclosure.

FIG. 8 presents a flowchart representation of a method in accordance with an embodiment of the present disclosure. In particular, a method is presented for use in conjunction with one or more functions and features described in conjunction with FIGS. 1-7. Step 400 includes receiving a transport stream via an interface module. Step 402 includes buffering the received transport stream. Step 404 includes processing the transport stream, via a polling processor, to generate the processed transport stream, wherein the polling processor operates to descramble individual packets of the transport stream in a plurality of polling slots of a polling loop. Step 406 includes buffering the processed transport stream for output by the interface module.

In an embodiment, the individual packets of the transport stream are each descrambled in a corresponding one of the plurality of polling slots in the polling loop. The polling processor can operate in the corresponding one of the plurality of polling slots to retrieve a corresponding one of the individual packets of the transport stream from the input buffer, to descramble the corresponding one of the individual packets of the transport stream to generate a processed packet, and to load the processed packet in the output buffer. The polling processor can operate to process individual packets of the transport stream without an operating system and/or without the use of interrupt service routines.

Figure 9:
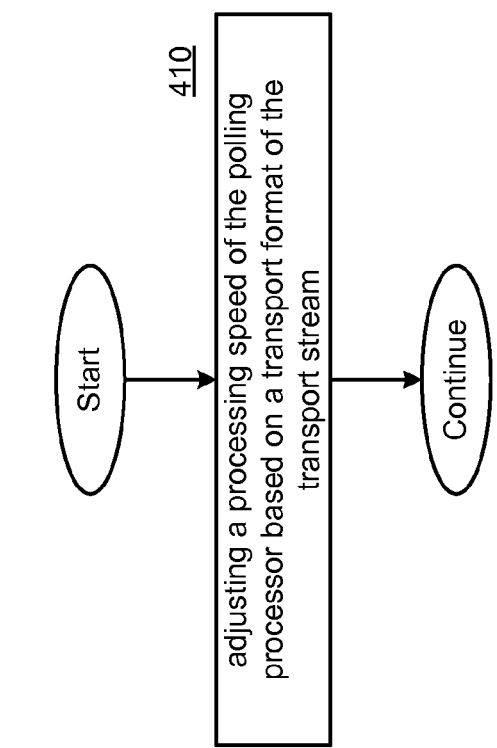
FIG. 9 presents a flowchart representation of a method in accordance with an embodiment of the present disclosure.

FIG. 9 presents a flowchart representation of a method in accordance with an embodiment of the present disclosure. In particular, a method is presented for use in conjunction with one or more functions and features described in conjunction with FIGS. 1-8. Step 410 includes adjusting a processing speed of the polling processor based on a transport format of the transport stream. In an embodiment, the processing speed of the polling processor is adjusted based on the transport format of the transport stream to maintain a processing margin for each of the plurality of polling slots.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A content access device comprising:
   an interface module that receives a transport stream and outputs a processed transport stream;
   an input buffer, coupled to the interface module, for buffering the received transport stream;
   a polling processor, coupled to the input buffer, that processes the transport stream to generate the processed transport stream, wherein the polling processor operates via polling to descramble individual packets of the transport stream in a plurality of polling slots of a polling loop, wherein the polling slots facilitate a predetermined set of packet processing tasks by the polling processor on the individual packets of the transport stream including descrambling of the individual packets of the transport stream, wherein the polling processor initiates each of the plurality of polling slots by polling the input buffer for a corresponding one of the individual packets of the transport stream, descrambles the corresponding one of the individual packets retrieved from the input buffer, and wherein the plurality of polling slots have a polling slot duration selected to complete the predetermined set of packet processing tasks by the polling processor on the corresponding one of the individual packets of the transport stream; and
   an output buffer, coupled to the polling processor and the interface module, for buffering the processed transport stream for output by the interface module.

2. The content access device of claim 1 wherein the predetermined set of packet processing tasks by the polling processor further include retrieving a corresponding one of the individual packets of the transport stream from the input buffer, generating a processed packet based on the descrambling of the corresponding one of the individual packets of the transport stream, and loading the processed packet in the output buffer.

3. The content access device of claim 1 wherein a processing speed of the polling processor is adjusted based on a transport format of the transport stream.

4. The content access device of claim 3 wherein the processing speed of the polling processor is adjusted based on the transport format of the transport stream to select the polling slot duration to maintain a processing margin for each of the plurality of polling slots beyond an expected time to complete the predetermined set of packet processing tasks by the polling processor.

5. The content access device of claim 1 wherein the polling processor operates to process individual packets of the transport stream without an operating system.

6. The content access device of claim 1 wherein the polling processor operates to process individual packets of the transport stream without use of interrupt service routines.

7. A method comprising:
   receiving a transport stream via an interface module;
   buffering the received transport stream in an input buffer;
   processing the transport stream, via a polling processor, to generate the processed transport stream, wherein the polling processor operates via polling to descramble individual packets of the transport stream in a plurality of polling slots of a polling loop, wherein the polling slots facilitate a predetermined set of packet processing tasks by the polling processor on the individual packets of the transport stream including descrambling of the individual packets of the transport stream, wherein the polling processor initiates each of the plurality of polling slots by polling the input buffer for a corresponding one of the individual packets of the transport stream, descrambles the corresponding one of the individual packets retrieved from the input buffer, and wherein the plurality of polling slots have a polling slot duration selected to complete the predetermined set of packet processing tasks by the polling processor on the corresponding one of the individual packets of the transport stream; and
   buffering the processed transport stream in an output buffer for output by the interface module.

8. The method of claim 7 wherein the predetermined set of packet processing tasks by the polling processor further include retrieving a corresponding one of the individual packets of the transport stream from the input buffer, generating a processed packet based on the descrambling of the corresponding one of the individual packets of the transport stream, and loading the processed packet in the output buffer.

9. The method of claim 7 further comprising:
   adjusting a processing speed of the polling processor based on a transport format of the transport stream.

10. The method of claim 9 wherein the processing speed of the polling processor is adjusted based on the transport format of the transport stream to select the polling slot duration to maintain a processing margin for each of the plurality of polling slots beyond an expected time to complete the predetermined set of packet processing tasks by the polling processor.

11. The method of claim 7 wherein the polling processor operates to process individual packets of the transport stream without an operating system.

12. The method of claim 7 wherein the polling processor operates to process individual packets of the transport stream without use of interrupt service routines.

* * * * *